United States Patent [19]

Grendol et al.

[11] Patent Number: 4,704,015

[45] Date of Patent: Nov. 3, 1987

[54] DEVICE FOR ATTACHING A REPLACEABLE NOSEPIECE TO AN EYEGLASS FRAME

[75] Inventors: Clark L. Grendol; Raoul O. Desy, both of Sturbridge, Mass.

[73] Assignee: American Optical Corporation, Southbridge, Mass.

[21] Appl. No.: 749,579

[22] Filed: Jun. 27, 1985

[51] Int. Cl.$^4$ .............................................. G02C 5/12
[52] U.S. Cl. ..................................... 351/138; 351/137; 351/88
[58] Field of Search .......................... 351/88, 132, 138; 2/445, 446

[56] References Cited

U.S. PATENT DOCUMENTS

| | | | |
|---|---|---|---|
| 3,391,976 | 7/1968 | Lindbloom | 351/88 |
| 3,584,939 | 6/1971 | Olson | 351/132 |
| 4,405,214 | 9/1983 | Bolle | 351/138 |

FOREIGN PATENT DOCUMENTS

| | | | |
|---|---|---|---|
| 144718 | 7/1979 | Fed. Rep. of Germany | 351/132 |
| 2419526 | 9/1979 | France | 351/138 |
| 2472764 | 7/1981 | France | 351/136 |
| 2117919 | 10/1983 | United Kingdom | 351/132 |

Primary Examiner—Rodney B. Bovernick
Attorney, Agent, or Firm—Pahl, Lorusso & Loud

[57] ABSTRACT

A system for attaching a replaceable, customizable nosepiece to an eyeglass frame is disclosed where the eyeglass and nosepiece fit together through a snappable attachment. The eyewires of the eyeglass frame are provided with a notch and adjacent projection. The nosepiece is roughly horseshoe shape, sized and shaped to fit between the eyewires under the connecting bridge of the frame. The tips of the horseshoe are shaped to snap into the notches on the eyewires, and be retained by the adjacent projections. In this manner, the nosepiece may be specifically selected for or customized to the particular size and shape of the user's nose.

5 Claims, 5 Drawing Figures

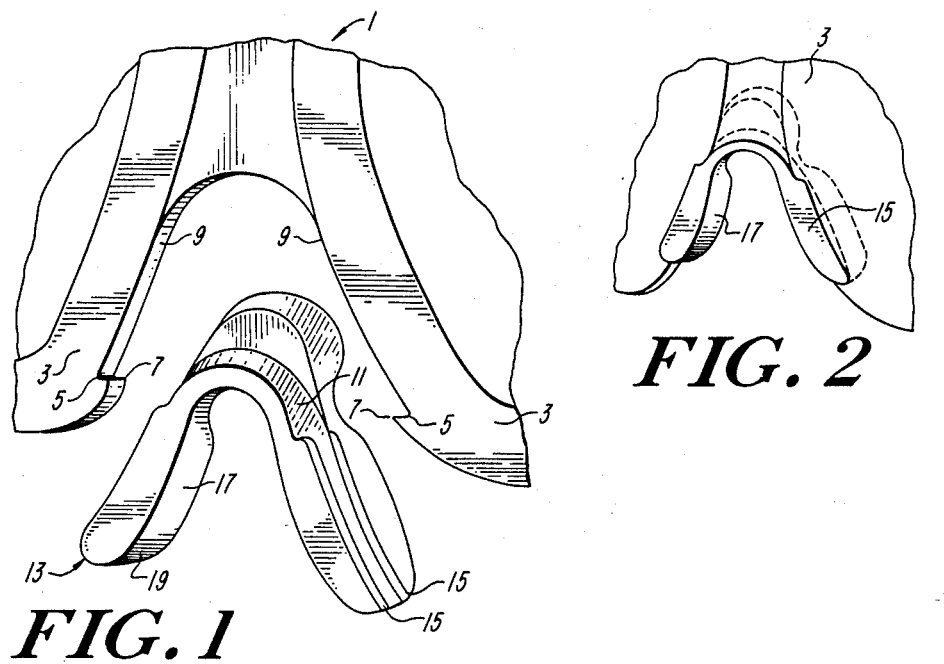
FIG. 1
FIG. 2
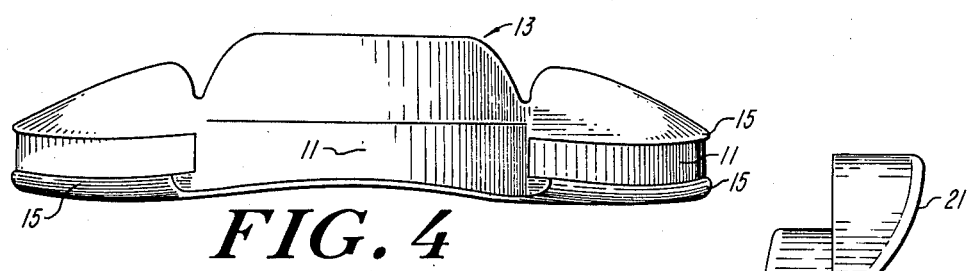
FIG. 4
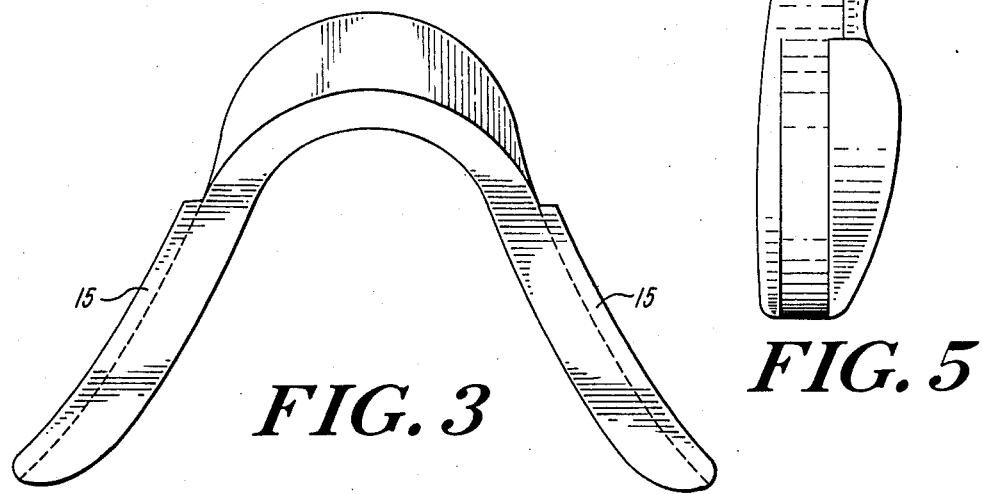
FIG. 3
FIG. 5

DEVICE FOR ATTACHING A REPLACEABLE NOSEPIECE TO AN EYEGLASS FRAME

BACKGROUND OF THE INVENTION

This invention relates generally to the field of eyeglass construction, and specifically to a method of attaching a customizable, replaceable, nosepiece to an eyeglass frame.

Eyeglasses must be fitted to the wearer's face. There are many adjustments and measurements that must be made to accomodate the prescription of the wearer, and to insure that the eyeglasses will be comfortable. Among these adjustments are the width of the frame, the pupil separation, the length of the temples, the pantoscopic angle, and the shape and size of the nosepiece. The glasses are supported on the wearer's face by resting on the bridge of the wearer's nose, and by the temples which rest upon the wearer's ears. Because most of the weight of the glasses is in the lenses, most of the weight of glasses rests upon the wearer's nose. In the case of spectacles having glass lenses, with a high magnification prescription, this weight can be considerable.

It is known to provide a nosepiece to distribute the weight of the eyeglasses. With plastic rim glasses, a nose support is often integrally molded with the frame, being positioned near the juncture of the eyewires. A major drawback with this design, is that once manufactured, the frame cannot be customized to the particular wearer's nose. Therefore, in order to provide a wide variety of frames, and to be able to accomodate the wide variety of nose shapes and sizes of the populace, an optometrist must stock a large number of eyeglass frames. In practice, rather than providing for many different accomodations with respect to nose size and shape, each frame size and style has its own nosepiece size and style, and the user is faced with little opportunity for customization. As a result, many sizes and styles of eyeglasses are uncomfortable for many wearers.

It is also known to provide nosepieces that are attached to the frame with an attachment that permits slight manipulation. For instance, the standard nosepieces on wire frame glasses consist of disk-like pads attached through a swivel to a metal wire which is welded to the eyewires. The swivel adjusts to a small degree, and further, the metal wire may be carefully bent and shaped to accommodate the shape of the wearer's nose. A drawback of this systems is that the metal wire is fragile, and often becomes bent or broken. Thus, it may not be used in safety spectacles, which must be used under harsh conditions and often experience severe impacts. Further, adjustment is difficult and requires special tools and expertise. Additionally, the nose pads concentrate the weight of the glasses on two spots on either side of the nose. In the case of heavy glasses, this sometimes causes irritation and may be very uncomfortable. Finally, this system is not well suited to plastic frame glasses, which must be used for safety glasses, and which have better durability and provide an opportunity for stylistic variations.

Thus, several of the objects of our invention are: to provide a replaceable nosepiece in a plastic eyeglass frame; to provide a replaceable nosepiece for glasses that may be manufactured in a wide variety of preselected shapes and that may be formed into custom fitted shapes; to provide such a device where customizing the nosepiece fit of the eyeglasses may be easily and quickly accomplished without special skills or tools; to provide a replaceable nosepiece that distributes the weight of the glass as evenly and comfortably as possible upon the wearer's nose; and to provide a replaceable nosepiece that will stay in place under impacts experienced by safety spectacles.

SUMMARY OF THE INVENTION

Our invention consists of an eyeglass frame and nosepiece combination, where the frame and nosepiece are designed to fit together through a snappable attachment, which attachment is semi-permanent after combination. By semi-permanent we mean that the nosepiece will not come loose during normal use, or under significant impact, but may be removed by flexing the nosepiece. In this manner, the frames may be identical, over a wide range of nose sizes, with the individual nosepieces being either of finer variation from prefabricated nosepiece to nosepiece, or actually customized to the shape of the wearer's nose.

BRIEF DESCRIPTION OF THE FIGURES OF THE DRAWING

FIG. 1 shows an isometric view of one embodiment of our invention, showing the nosepiece and cooperating eyeglass frame disassembled.

FIG. 2 shows the embodiment of our invention shown in FIG. 1, with the nosepiece and eyeglass frame assembled.

FIG. 3 is a plan view, from the front, showing the nosepiece portion of the embodiment of our invention shown in FIG. 1.

FIG. 4 is a view of the nosepiece of FIG. 3, as viewed from above.

FIG. 5 is a side view of the nosepiece as shown in FIG. 3.

DETAILED DESCRIPTION OF THE PREFERRED EMBODIMENT

Our invention will be most readily understood from reference to the figures identified above, and the discussion which follows. Turning first to FIG. 1, an embodiment of our invention suitable for use with plastic eyeglass frames is shown. The frame 1 is provided with eyewires 3. Each of the eyewires have a notch 5 and an adjacent projection 7. A recess surface 9 is provided extending from notch 5 on one eyewire up around under the nose area and back down to notch 5 on the other eyewire. This recess surface is of a width, shape and finish to mate with a cooperating surface 11 provided on the removable nosepiece 13. Adjoining this surface 11, on each side of the nosepiece, are a pair of ridges 15 which, when assembled with the eyeglass frame, rest on either side of the eyewire, preventing relative forward or rearward motion between the nosepiece and the eyewires. The cooperation of the ridges 15 and the eyewire 3 may best be seen as viewed in FIG. 2.

The nosepiece is of a generally horseshoe shape. The inner surface 17 of the nosepiece may be customized or specially selected to conform to the shape and size of the wearer's nose. The inner surface has a part referred to herein as the "wing portion" 19, which contacts the side of the user's nose and a "bridge portion" 21, which rests upon the bridge of the user's nose. Each of these portions may be custom fit to the user, by means of a thermo-plastic, or other molding technique. However, more likely, a wide variety of shapes and sizes may be made up, from which the user chooses that which fits him of her the best.

As can be seen from FIGS. 1 and 2, to install the nosepiece, it is inserted in the recess 9 of the eyeglass frame. The tips of the wing portions of the nosepiece fit into the notches 5 and the projecting portions 7 retain the nosepiece from coming out. It is possible to remove the nosepiece by flexing the nosepiece after insertion, although in the normal course of use of the eyeglasses, this would not be necessary. No special tools or skills are needed either to install or remove the nosepiece.

The foregoing description should be taken as illustrative, and not limiting in any sense. Variations on the invention as have been described, will be evident to one skilled in the art. For instance, the nosepiece need not be customizable in all dimensions. The bridge portion may be standard with respect to wide ranges of users. Rather than the ridges 15 on the nosepiece, ridges may be located on the eyewire, with the corresponding flat surface located on the nosepiece.

Having thus described our invention we claim:

1. A system for attaching a nosepiece to an eyeglass frame to be worn by a user, comprising:
    an eyeglass frame having a pair of eyewires;
    a bridge connecting the eyewires, each eyewire having a notch and a contiguous projection located between the connecting bridge and the center point of the bottom half of the eyewire;
    a substantially horseshoe shaped nosepiece, having two arms, and an open end and a closed end, each of said arms including a pair of ridges with one of said ridges located along a forward edge of an outside surface of the arm and the other ridge of said pair of ridges being located along a rearward edge of an outside surface of the arm, said ridges of each pair of ridges being spaced apart a sufficient distance to engage the eyewire between said pair of ridges;
    the outside shape and size of the nosepiece being matched with the shape and size of the eyewires and bridge connecting the eyewires, such that the nosepiece may be snapped into place between the eyewires with a bottom surface of each of said arms resting on a top surface of said contiguous projection so that said nosepiece is retained by said notches and projections engaging said arms and so that said outside surface of each arm of said nosepiece abuts a portion of the eyewire adjacent the outside surface.

2. The system of claim 1 where said nosepiece further comprises a bridge portion adjacent the closed end of the horseshoe.

3. The system of claim 1 where the nosepiece is made of a thermo-plastic, capable of being molded to conform to the shape of a user's nose.

4. The system of claim 2 where the nosepiece is made of a thermo-plastic, capable of being molded to conform to the shape of the user's nose.

5. The system of claim 1, where the eyeglass frames are made of plastic.

* * * * *

UNITED STATES PATENT AND TRADEMARK OFFICE
CERTIFICATE OF CORRECTION

PATENT NO. : 4,704,015

DATED : November 3, 1987

INVENTOR(S) : Clark L. Grendol, et al

It is certified that error appears in the above-identified patent and that said Letters Patent is hereby corrected as shown below:

After column 1, line 5 insert --The Government may have rights in this invention pursuant to Contract No. DAMD17-85-C-5073 awarded by the Department of the Army.--

Signed and Sealed this

Twentieth Day of October, 1992

Attest:

DOUGLAS B. COMER

Attesting Officer

Acting Commissioner of Patents and Trademarks